United States Patent [19]

Hebda

[11] 4,116,341
[45] Sep. 26, 1978

[54] DEVICE FOR STORING BICYCLES IN A BUILDING

[76] Inventor: Thomas Hebda, 235 Vance, Lombard, Ill. 60148

[21] Appl. No.: 705,927

[22] Filed: Jul. 16, 1976

[51] Int. Cl.² .............................................. A47F 7/00
[52] U.S. Cl. ..................... 211/17; 211/116; 224/42.03 B; 224/42.46 R; 248/317
[58] Field of Search ......... 224/29 R, 42.03 B, 42.1 R, 224/42.1 C, 42.1 CA, 42.44, 42.08, 29.5, 42.46 R, 42.46 A, 42.46 B, 42.45 R; 211/17, 18, 19, 21, 22, 113, 116, 118, 20, 99, 100, 101, 117; 105/367, 325, 373; 182/97, 98; 248/317, 324, 343

[56] References Cited

U.S. PATENT DOCUMENTS

| 393,975 | 12/1888 | Gordon | 224/29.5 X |
|---|---|---|---|
| 557,567 | 4/1896 | Eddy | 211/17 |
| 569,289 | 10/1896 | Lynch | 224/29.5 X |
| 580,032 | 4/1897 | Bierbach | 105/367 X |
| 1,779,662 | 10/1930 | Cleland | 224/42.08 |
| 3,261,521 | 7/1966 | Meccico | 224/42.44 |
| 3,765,581 | 10/1973 | Kosecoff | 224/42.03 B |
| 3,770,133 | 11/1973 | Kolker | 105/367 X |
| 3,872,972 | 3/1975 | Cummins et al. | 211/17 |
| 3,876,123 | 4/1975 | Stuntz | 224/42.03 B |
| 3,877,622 | 4/1975 | McLain | 211/17 X |
| 3,921,869 | 11/1975 | Rogers | 224/42.03 B |

FOREIGN PATENT DOCUMENTS

| 740,061 | 10/1943 | Fed. Rep. of Germany | 211/117 |
|---|---|---|---|
| 77,670 | 6/1946 | Norway | 211/116 |
| 123,961 | 2/1949 | Sweden | 224/42.03 B |

Primary Examiner—Trygve M. Blix
Assistant Examiner—Winston H. Douglas
Attorney, Agent, or Firm—Carl C. Batz

[57] ABSTRACT

A device for storing bicycles in a building such as a garage where there is space over the hood of an automobile parked in a garage. The device includes brackets or means for attaching the device to the frame structure of the building, and a rack on which the bicycles are mounted, the rack being pivotally connected with the brackets so that the rack may be turned forwardly about its pivot to bring the rack and bicycles thereon from vertical to horizontal position. Another feature is means associated with the brackets and the rack to prevent the rack from turning the wrong way about its pivot. Another feature involves clamping means for grasping the inclined members of a bicycle frame near the center of gravity of the bicycle frame. Another embodiment includes means for mounting a rack such as above referred to at the rear end of an auto.

3 Claims, 4 Drawing Figures

DEVICE FOR STORING BICYCLES IN A BUILDING

The invention relates to a device for storing bicycles in the upper portion of a garage or for mounting one or more bicycles at the rear of an automobile.

In many garages in which automobiles are parked for storage there is a substantial volume of space at the rear of a garage over the hood of the parked cars which space is not ordinarily utilized. Bicycles which need to be stored may be parked in the garage at the sides of the parked cars, but space may not be available there, and there is always the danger that in moving the cars and bicycles in and out of the garage the bicycles will be run over and damaged.

I am aware that there have been attempts to store bicycles by suspending them with cables and hooks, but so far as I aware these devices are insecure and inconvenient and do not support the bicycles with the solidity and ridigity which is required.

Accordingly, an object of this invention is to provide a device for holding a bicycle in a secure manner without a lot of trouble in the attachment of the bicycles and which can be folded to bring the bicycle from a vertical to a horizontal overhead position in the garage such as over the hood of an automobile parked in the garage.

A further object is to provide such a device to which a bicycle can be securely mounted while the bicycle is in upright position and which will allow the bicycle easily to be swung into horizontal storage position.

Yet another object is to provide such a device having brackets which may be attached to the ceiling frame structure of a garage and a rigid rack pivotally attached to these brackets, the rack being movable about its pivot from a vertical to a horizontal position under the garage ceiling.

Another object is to provide such a bracket and rack structure which will allow the rack to be turned in one direction about its pivot towards horizontal position but not in the other direction.

Yet a further object is to provide a device having a rigid rack structure to which a bicycles can be mounted, and which has the means for easily attaching the rack structure at the rear of an automobile.

One embodiment of my invention is illustrated in the accompanying drawings in which FIG. 1 is a front elevational view showing the rack in vertical position;

Figures 1, 2:
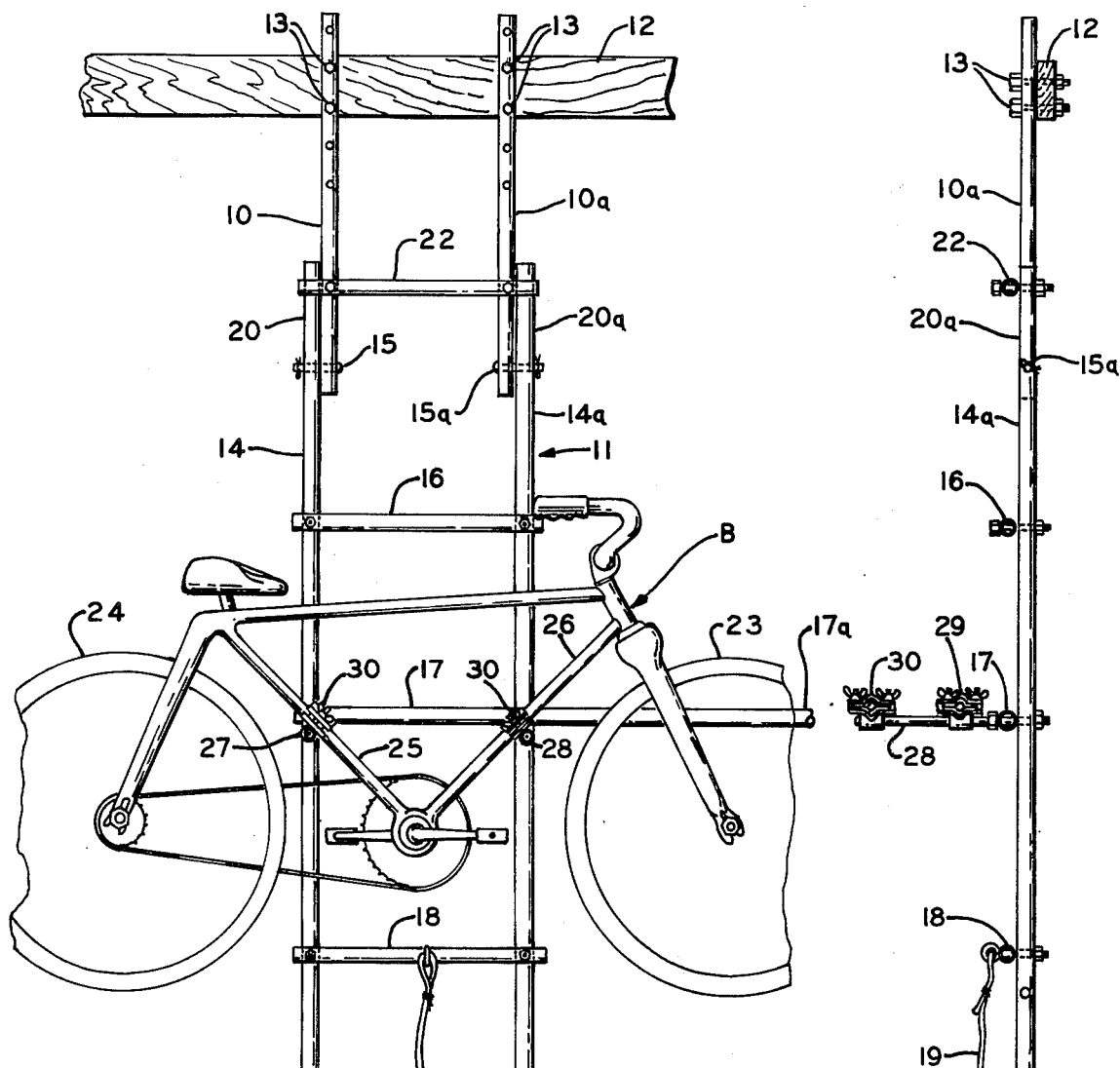
FIG. 2 is an elevational end view of the device.

As illustrated, the device includes a pair of spaced brackets 10 and 10a which are fixedly fastened to the ceiling frame structure 12 of a garage. Bolts or screws 13 may be used for fastening the brackets.

A rack 11 having the parallel rigid standards 14 and 14a is provided. These standards are shown in their vertical position in FIGS. 1 and 2, and in their horizontal position in FIG. 3. As illustrated, the upper end portions of standards 14 and 14a are aligned with and are on the outside of the brackets 10 and 10a. The pin 15 extends through standard 14 and through bracket 10 to thereby pivotally attach standard 14 of the rack to the end of bracket 10, and the pin 15a extends through standard 14a and through 10a to pivotally attach standard 14a of the rack to the bracket 10a.

Figure 3:
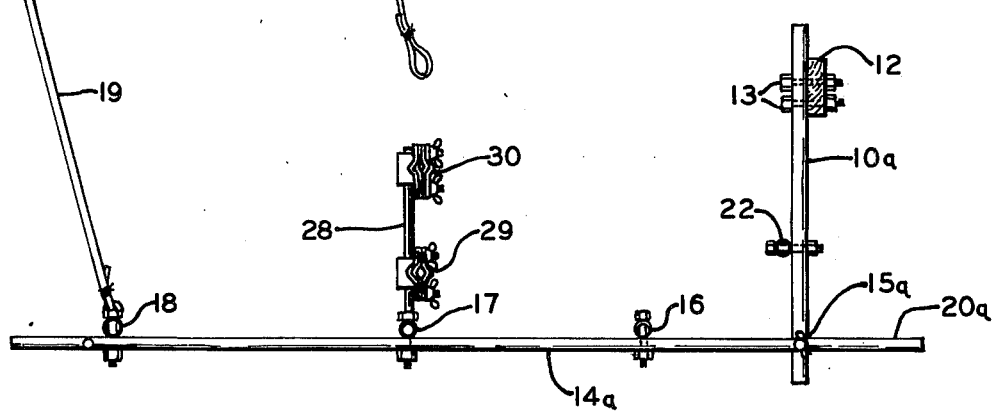
FIG. 3 is a view like FIG. 2, but showing the rack turned about its pivot into horizontal position.

The rack has the spaced cross pieces 16, 17 and 18 which may be metal tubing and which extend transversely of the rack. These cross pieces may be attached permanently to the standards as by the use of screws or bolts extending through the tubing and into the standards. These cross pieces strengthen the rack and in addition pieces 17 and 18 perform special functions. Piece 17 has an extension 17a which passes beside the front wheel of a bicycle to keep the wheel from turning. (See FIG. 1 of the drawing.) The cross piece 18 has attached in the center thereof a cord 19, and this cord may have at its other end a loop which engages a hook in the ceiling so that the rack is held in horizontal position as shown in FIG. 3.

At their upper ends the standards 14 and 14a extend upwardly beyond the pivotal connections with brackets 10 and 10a, and the upper end portions 20 and 20a cooperate with cross piece 22 to prevent backward turning of the rack about the pivot. The cross piece 22 extends transversely of the standards and is fixedly attached to the front edges of the brackets 10 and 10a. The ends of piece 22 extend somewhat beyond the brackets so that they engage the ends of standards 14 and 14a to prevent the turning of the rack about the pivots in a backward direction, but will permit the rack to move in a forward direction about the pivots as the rack is moved from vertical to horizontal position.

There is shown in FIG. 1 a bicycle B which has a front wheel 23 and the rear wheel 24, and has the usual inclined members 25 and 26 of the bicycle frame.

The means for mounting the bicycle on the rack include the bars 27 and 28 which have their one ends secured to the standards 14 and 14a and extend forwardly of the rack. Clamps 29 are secured at a medium position on bars 28 and are for securely holding a first bicycle in spaced relation to the rack; and clamps 30 are secured at the ends of the bars so as to serve in holding a second bicycle in spaced relation to the first bicycle. These clamps may be of the type which has one jaw on one side of a member 25 or 26 and another jaw on the other side of this member with a winged nut which may be turned to bring the clamp into firm engagement with the member. Padding material may be used on the inside of the clamp to avoid damage to the finish of the bicycle.

When a bicycle is to be stored the device has its rack in vertical position as shown in FIGS. 1 and 2, and a bicycle may be ridden to a position alongside the rack. The inclined members 25 and 26 are placed in the clamps 29 and the clamps tightened. Conveniently, the clamps are mounted on the rods 28 at a proper angle so that the clamps line up with the inclined members 25 and 26, as shown in FIG. 1. A second bicycle may be similarly secured using the clamps 30.

After the bicycle or bicycles are mounted on the rack the lower end of the rack may be swung forwardly to bring the rack into horizontal position. The end of cord 19 may be fastened at the ceiling of the garage to hold the bicycles in horizontal position until they are to be again taken from storage. It is particularly desirable that the bicycles be held through attachment with the median portion of these inclined frame members. This puts the attachment near the center of gravity of the bicycle whether the bicycles are in vertical or horizontal position. Also the structure whereby rods 28 are provided and the clamps mounted on the rods allow the clamps to be set at an angle so that they line up with the inclined frame members of the bicycles.

The arrangement whereby the rack cannot be turned backwards about its pivot is also an advantage in that the rack is held strictly in vertical position and does not move away from a person when a person is attempting to put the bicycle in position on the rack.

Figure 4:
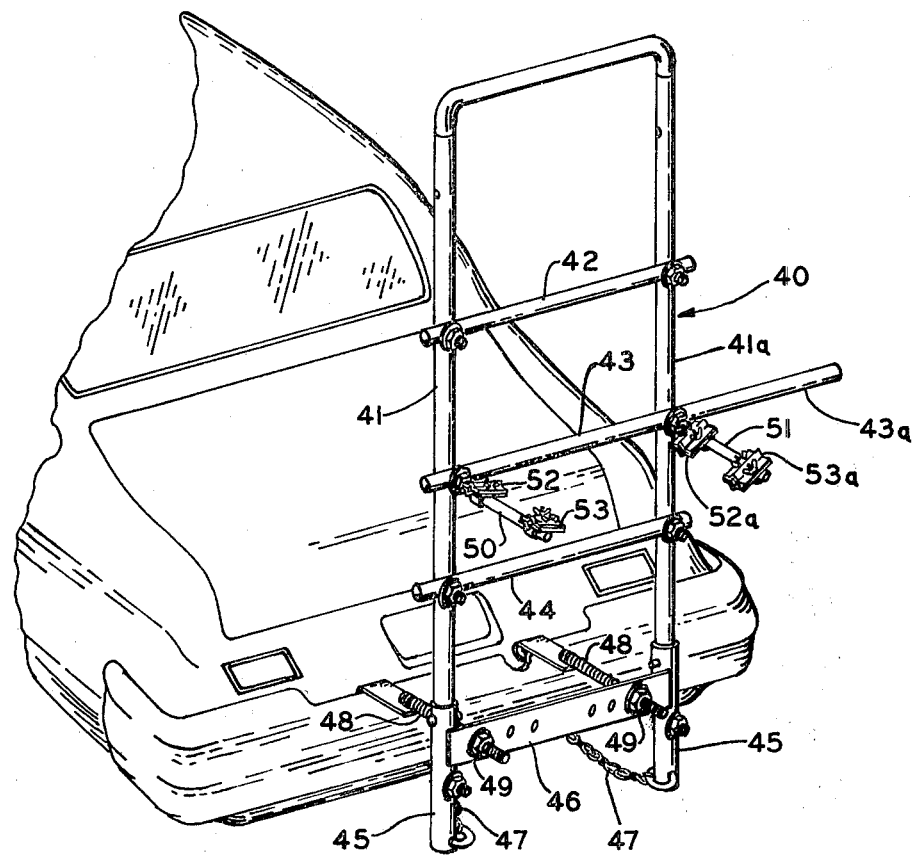
FIG. 4 is a perspective view of my improved rack as mounted at the rear end of an automobile.

FIG. 4 shows another modification in which a rack 40 is utilized and which includes standards 41, 41a and cross pieces 42, 43, and 44. Cross piece 43 has an extension 43a alongside the front wheel of a bicycle when the bicycle is mounted on the rack, so as to keep the front wheel from turning. For mounting the rack at the rear end of an automobile I provide the tubular holders 45 each of which is vertical and adapted to receive the lower ends of standards 41 and 41a therein. These holders are connected by a strap 46. The lower ends of holders 45 are each connected by a chain 47 with some part of the frame underneath the car. The bolts 48 engage the top of the bumper at their one end and have their threaded portions extending through the strap. Nuts 49 may be tightened on the bolt to bring chains 47 into taut condition and to secure the holders 45 in place. Additional holes 55 may be included in the strap 46 to allow use of the rack in connection with bumpers of different kinds and shapes.

The means for clamping bicycles on the rack 40 may be similar to that of the first embodiment herein described. The bars 50 and 51 have their four ends secured to standards 41 and 41a and these bars have attached to them the clamps 52 and 52a to hold a first bicycle, and the clamps 53 and 53a to hold a second bicycle. The clamps 42-42a and 43-43a are themselves slanted so that they are aligned with the inclined frame members of the bicycles.

In assembling the device the lower ends of standards 41 and 41a are put into the holders 45 and a cotter key may be passed through the holder and the lower end portion of the standards to hold the rack in place.

While only certain embodiments of the invention have been described in detail it will be apparent that many embodiments may be constructed and it will be apparent to those skilled in this art that many changes may be made and the structures varied in many ways all within the spirit of the invention and the scope of the appended claims.

I claim:

1. A device for storing a bicycle in a building structure comprising a pair of spaced straight vertical brackets attached to and depending from said structure, a pair of rigid spaced straight standards, said standards being in the same plane as said brackets when said standards are in vertical position, a pair of pins each extending through one of said standards and one of said brackets at a point spaced below the upper end of said standards when said standards are in a vertical position to thereby pivotally attach said standards to said brackets, a rigid cross piece extending horizontally across and attached to the front of said brackets and extending in front of the upper end portions of said standards to thereby prevent rearward movement of said standards about their pivots but permit forward movement of said standards about their pivots from a vertical position forwardly to a horizontal position, and means for clamping the frame of a bicycle to said standards when said standards are in vertical position whereby said bicycle is turned to a horizontal position when said standards are turned to a horizontal position.

2. A device as set forth in claim 1 in which said clamping means includes a pair of spaced rods attached to and extending forwardly of said standards, a pair of spaced clamps secured to each of said rods, each of said clamps being adjustable to different positions above the axis of said rods, a pair of bicycles each having inclined frame members, the inclined members of one of said bicycles being held in one of said clamps on each of said rods and the inclined members of the other of said bicycles being held in the other clamp on each of said rods.

3. A device for storing a bicycle in a building structure comprising a pair of spaced vertical brackets attached to and depending vertically from said structure; a pair of rigid spaced standards, a pair of pins each extending through one of said standards and one of said brackets to thereby pivotally attach said standards to said brackets, each of said standards depending vertically from its pivotal connection, and means for clamping the frame of a bicycle to said standards with the bicycle in fixed spaced relation with respect to said standards and with said standards in vertical position, said standards being movable forwardly about their pivots to bring said standards and the bicycle clamped thereto into horizontal position in the upper portion of the interior of the building, said standards having attached thereto a plurality of vertically spaced cross pieces, one of said cross pieces extending along side the front wheel of said bicycle to a point beyond the axle of the front wheel of the bicycle to maintain said wheel in alignment with the frame of the bicycle.

* * * * *